United States Patent [19]
Renick et al.

[11] Patent Number: 5,813,289
[45] Date of Patent: Sep. 29, 1998

[54] STEERING COLUMN

[75] Inventors: Chester D. Renick, Lafayette; Albert E. Becker, Jr., West Lafayette; James M. Hobaugh, II, Lafayette, all of Ind.

[73] Assignee: TRW Inc., Lyndhurst, Ohio

[21] Appl. No.: 939,863

[22] Filed: Sep. 29, 1997

Related U.S. Application Data

[63] Continuation of Ser. No. 649,894, May 14, 1996, abandoned.
[51] Int. Cl.$^6$ .............................. B62D 1/18; G05G 5/16; G05G 5/18
[52] U.S. Cl. .............................. 74/493; 74/527; 74/531; 280/775
[58] Field of Search .......................... 74/493, 527, 531; 280/775

[56] References Cited

U.S. PATENT DOCUMENTS

| | | |
|---|---|---|
| 3,302,478 | 2/1967 | Pauwels . |
| 4,075,903 | 2/1978 | Cornell ..................................... 74/493 |
| 4,649,769 | 3/1987 | Venable . |
| 4,753,121 | 6/1988 | Venable et al. . |
| 4,793,204 | 12/1988 | Kubasiak . |
| 4,941,679 | 7/1990 | Baumann et al. ...................... 280/775 |
| 4,972,732 | 11/1990 | Venable et al. . |
| 5,363,716 | 11/1994 | Budzik, Jr. et al. . |
| 5,595,399 | 1/1997 | Fouquet et al. ........................ 74/493 X |

FOREIGN PATENT DOCUMENTS

| | | |
|---|---|---|
| 0529769 | 3/1993 | European Pat. Off. . |

*Primary Examiner*—Rodney H. Bonck
*Assistant Examiner*—Troy Grabow
*Attorney, Agent, or Firm*—Tarolli, Sundheim, Covell, Tummino & Szabo

[57] ABSTRACT

A steering column has a first steering column member movable axially relative to a second steering column member. A member having a plurality of teeth is connected to the first steering column member and movable with the first steering column member relative to the second steering column member. A support connects the steering column to a vehicle frame. A telescope locking member engages the plurality of teeth on the member connected to the first steering column member. The telescope locking member has a first position in which the telescope locking member engages at least one of the plurality of teeth on the member connected to the first steering column member to prevent movement of the first steering column member relative to the second steering column member. The telescope locking member has a second position in which the telescope locking member is spaced from the plurality of teeth on the member connected to the first steering column member to permit axial movement of the first steering column member relative to the second steering column member. The telescope locking member presses the member connected to the first steering column member against the support to prevent the first steering column member and the member connected to the first steering column member from moving relative to the support when the telescope locking member is in its first position. The telescope locking member includes a plurality of teeth for engaging the plurality of teeth on the member connected to the first steering column member.

30 Claims, 9 Drawing Sheets

5,813,289

STEERING COLUMN

This application is a continuation of application Ser. No. 08/649,894 filed on May 14, 1996 and now abandoned.

BACKGROUND OF THE INVENTION

The present invention relates to a steering column, and more specifically to a tilt-telescope steering column.

A known steering column is disclosed in U.S. Pat. No. 5,363,716. U.S. Pat. No. 5,363,716 discloses a steering column in which a first steering column member is axially movable relative to a second steering column member. A jacket tube connected to the first steering column member is movable with the first steering column member relative to the second steering column member. A support connects the steering column to a vehicle frame. A telescope locking mechanism includes a telescope lock bar fixedly attached to the support. The telescope lock bar extends through a tubular member connected with the first steering column member. Springs located within the tubular member are normally tightly wound upon the periphery of the telescope lock bar so that they grip the telescope lock bar and prevent relative movement between the telescope lock bar and the tubular member. Rotation of a lever about an axis of the telescope lock bar causes the springs to become partially unwound and release their grip on the telescope lock bar to permit telescoping of the first steering column member relative to the second steering column member.

SUMMARY OF THE INVENTION

The steering column of the present invention includes first and second steering column members. The first steering column member is axially movable relative to the second steering column member. A member having a plurality of teeth is connected to the first steering column member and movable with the first steering column member relative to the second steering column member. A support means connects the steering column to a vehicle frame. A telescope locking member is engageable with the plurality of teeth on the member connected to the first steering column member to prevent axial movement between the first and second steering column members.

The telescope locking member has a first position in which the telescope locking member engages at least one of the plurality of teeth on the member connected to the first steering column member to prevent movement of the first steering column member relative to the second steering column member. The telescope locking member has a second position in which the telescope locking member is spaced from the plurality of teeth on the member connected to the first steering column member to permit axial movement of the first steering column member relative to the second steering column member. The telescope locking member presses the member connected to the first steering column member against the support means to prevent the first steering column member and the member connected to the first steering column member from moving relative to the support means when the telescope locking member is in its first position. The telescope locking member includes a plurality of teeth for engaging the plurality of teeth on the member connected to the first steering column member.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF THE PREFERRED EMBODIMENTS

Figure 1:
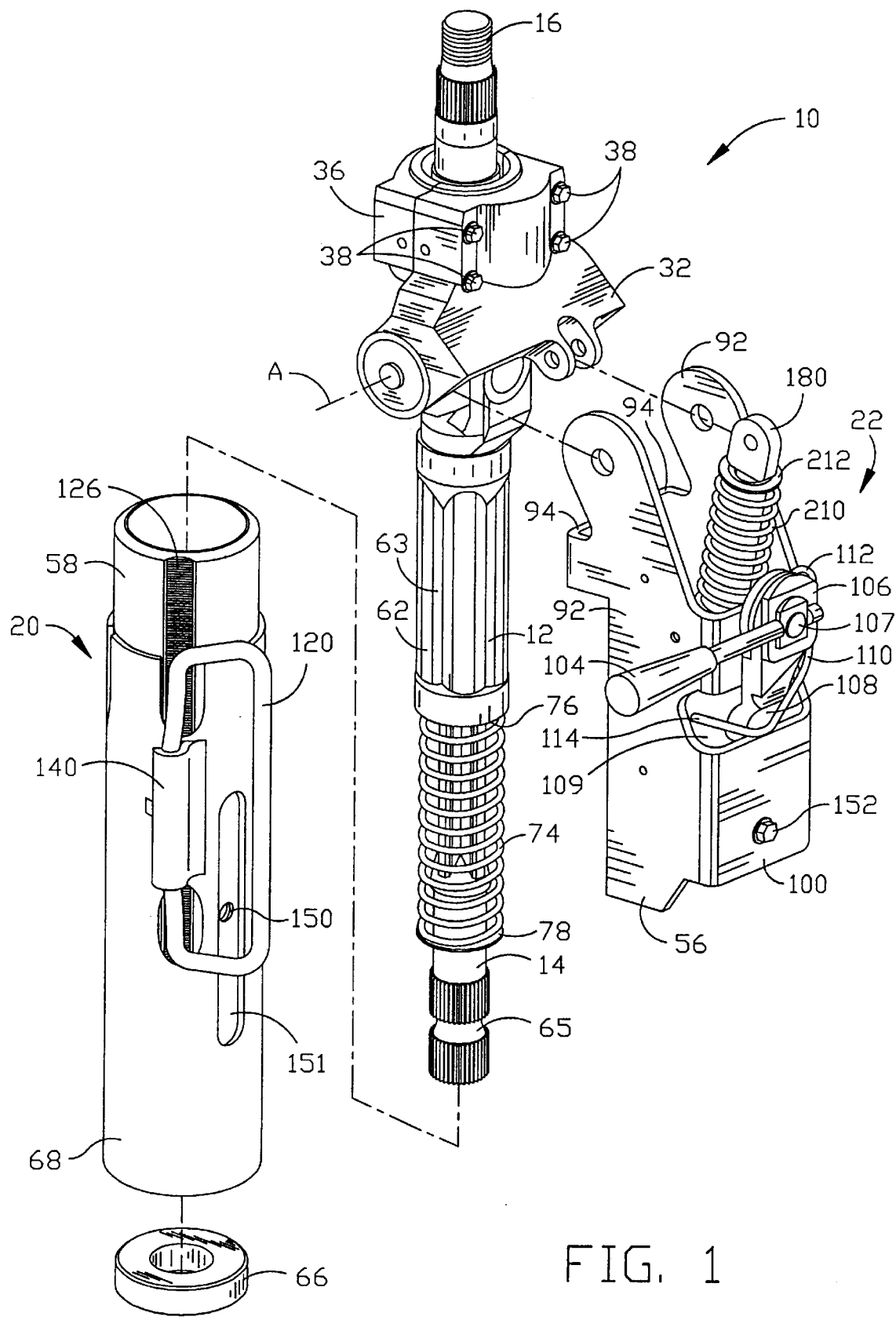
FIG. 1 is an exploded view of a first embodiment of a steering column of the present invention.
Figure 2:
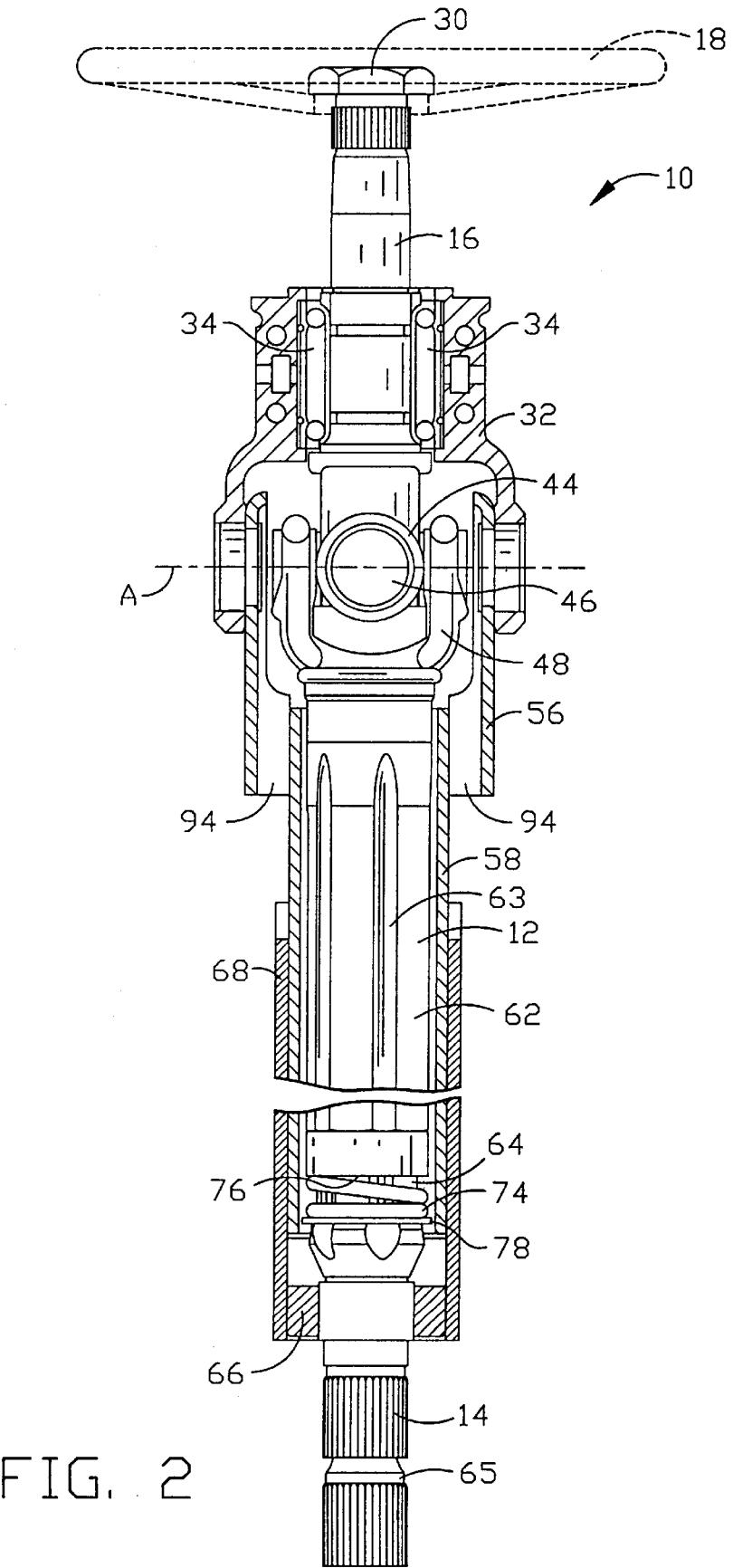
FIG. 2 is a sectional view of the steering column of FIG. 1.

A first embodiment of the present invention comprises an axially and angularly adjustable vehicle steering column 10 (FIG. 1). The steering column 10 includes a pair of steering column members 12, 14 and an input shaft 16. A vehicle steering wheel 18 (FIG. 2) is attached to the input shaft 16 by a nut 30. The input shaft 16 and steering column members 12, 14 rotate upon rotation of the vehicle steering wheel 18. The steering column members 12, 14 telescope to effect axial adjustment of the steering wheel 18. The input shaft 16 is pivotable relative to the steering column member 12 to effect angular adjustment of the steering wheel 18.

A releasable telescope locking mechanism 20 (FIG. 1) locks the steering column members 12, 14 in any one of a plurality of telescope positions. A releasable tilt locking mechanism 22 locks the input shaft 16 in any one of an infinite number of pivot positions relative to the steering column member 12.

The input shaft 16 (FIG. 2) extends into an upper housing 32. Bearings 34 (shown schematically in FIG. 2) are located in the upper housing 32 and support the input shaft 16 for rotation relative to the upper housing 32. A cover 36 (FIG. 1) is connected to the upper housing 32 by screws 38. The cover 36 is removable from the upper housing 32 so that the bearings 34 may be reached for repair and maintenance.

The input shaft 16 is connected to a yoke 44 (FIG. 2) of a universal joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and steering column member 12 rotate.

The upper housing 32 (FIG. 1) is pivotally connected to a bracket 56 which is connected to jacket tube 58 circumscribing the steering column member 12. The upper housing 32 is pivotable about the axis A relative to the bracket 56 and the jacket tube 58. Therefore, the upper housing 32 pivots along with the input shaft 16 relative to the bracket 56 and the steering column member 12.

The steering column member 14 extends into a lower tubular shaft portion 62 of the steering column member 12 (FIG. 1). The tubular shaft portion 62 has internal splines 63 (FIG. 3) thereon which mesh with external splines 64 on the steering column member 14. The splines 63 of the steering column member 12 mesh with the splines 64 of the steering column member 14 to effect rotation of the steering column member 14 upon rotation of the steering column member 12.

An axial end portion 65 (FIGS. 1 and 2) of the steering column member 14 is connectable to an output shaft (not shown). The output shaft is attached to a steering gear (not shown) of the vehicle. Steering column member 14 is supported by a bearing 66 for rotation relative to a tubular support 68 which is connectable to a frame of the vehicle in any known manner. The bearing 66 is connected inside the support 68 in any known manner. Upon rotation of the steering wheel 18, the input shaft 16 and the steering column members 12, 14 rotate and the rotational movement is transmitted to the output shaft to effect vehicle steering.

The steering column members 12, 14 may be moved axially (telescoped) relative to each other. A spring 74 (FIGS. 1 and 2) circumscribes the steering column member 14. The spring 74 acts between an axial end surface 76 of the steering column member 12 and a flange 78 connected to the steering column member 14. The spring 74 acts to bias the steering column member 12 in a vertical direction, as viewed in FIG. 1, relative to the steering column member 14.

The bracket 56 (FIG. 1) includes generally parallel side walls 92. Portions 94 extend radially inwardly from the side walls 92 and are connected to an upper portion of the jacket tube 58. A portion 100 of the bracket 56 extends between the side walls 92. The bracket 56 partially encloses the telescope locking mechanism 20 and the tilt locking mechanism 22.

A handle 104 and actuator member 106, connected to the handle, are pivotally mounted on the portion 100 of the bracket 56 by a pin 107. A portion 108 of the actuator member 106 extends into an opening 109 in the portion 100 of the bracket 56. A torsion spring 110 extends around the actuator member 106 to bias the handle 104 and the actuator member to an initial position in which the telescope locking mechanism 20 and the tilt locking mechanism 22 are locked. The handle 104, actuator member 106, and spring 110 move along with the bracket 56, the jacket tube 58, and the steering column member 12 relative to the steering column member 14.

Figure 5:
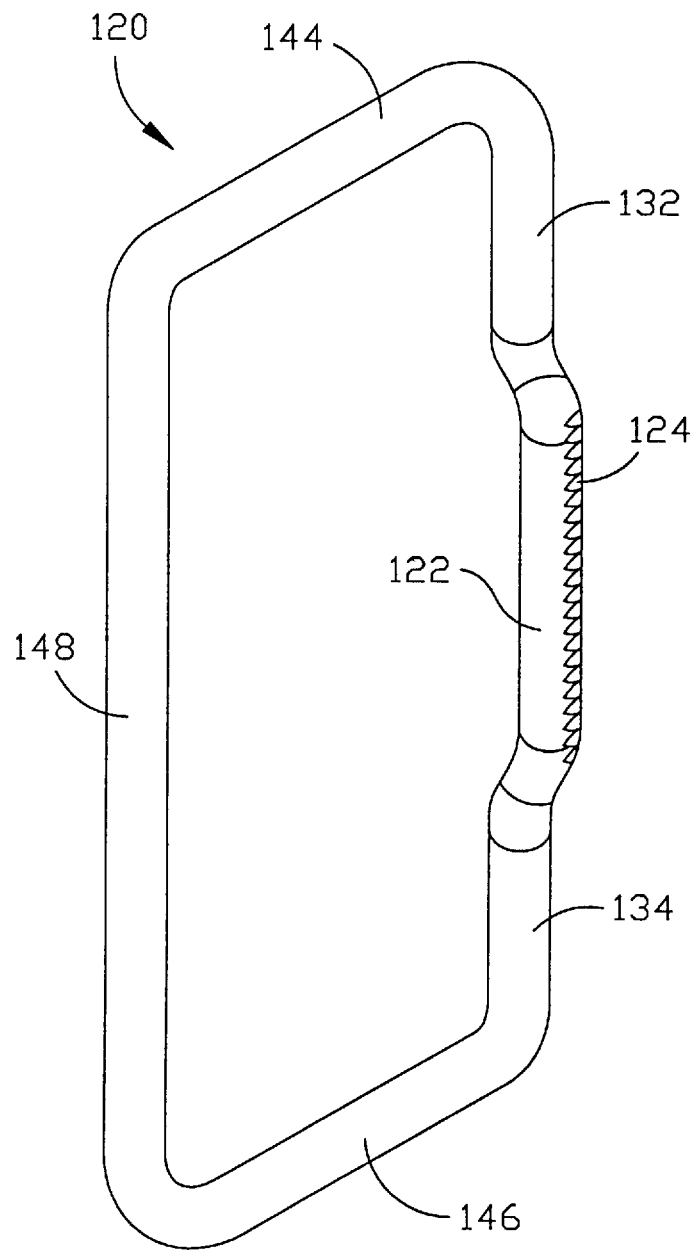
FIG. 5 is an enlarged pictorial view of a telescope locking member of the steering column of FIG. 1.

An end 112 (FIG. 1) of the spring 110 engages the portion 100 of the bracket 56 and the other end 114 of the spring engages a telescope locking member 120 (FIGS. 1 and 3) comprising a contoured rod. The portion 108 of the actuator member 106 also engages the telescope locking member 120. The telescope locking member 120 (FIG. 5) includes a longitudinally extending portion 122 with a plurality of relatively small teeth 124. The toothed portion 122 extends parallel to the jacket tube 58 and the first and second steering column members 12, 14. The toothed portion 122 extends through a slot 125 (FIG. 3) in the support 68. The teeth 124 of the toothed portion 122 are engageable with a plurality of relatively small teeth 126 (FIG. 1) on the jacket tube 58. When the toothed portion 122 engages the teeth 126 on the jacket tube 58, the telescope locking member 120 also presses the jacket tube against an inner surface 128 of the support 68 to prevent rattling of the steering column 10.

The number of teeth 124 on the portion 122 of the locking member 120 allows for an almost infinite axial adjustment of the steering column members 12, 14. The teeth 124 and the teeth 126 do not have to mesh exactly. If there is a tooth-to-tooth engagement, the steering column members 12, 14 will still be prevented from moving axially relative to each other since the number of teeth provides sufficient frictional engagement between the locking member 120 and the jacket tube 58.

Figure 3:
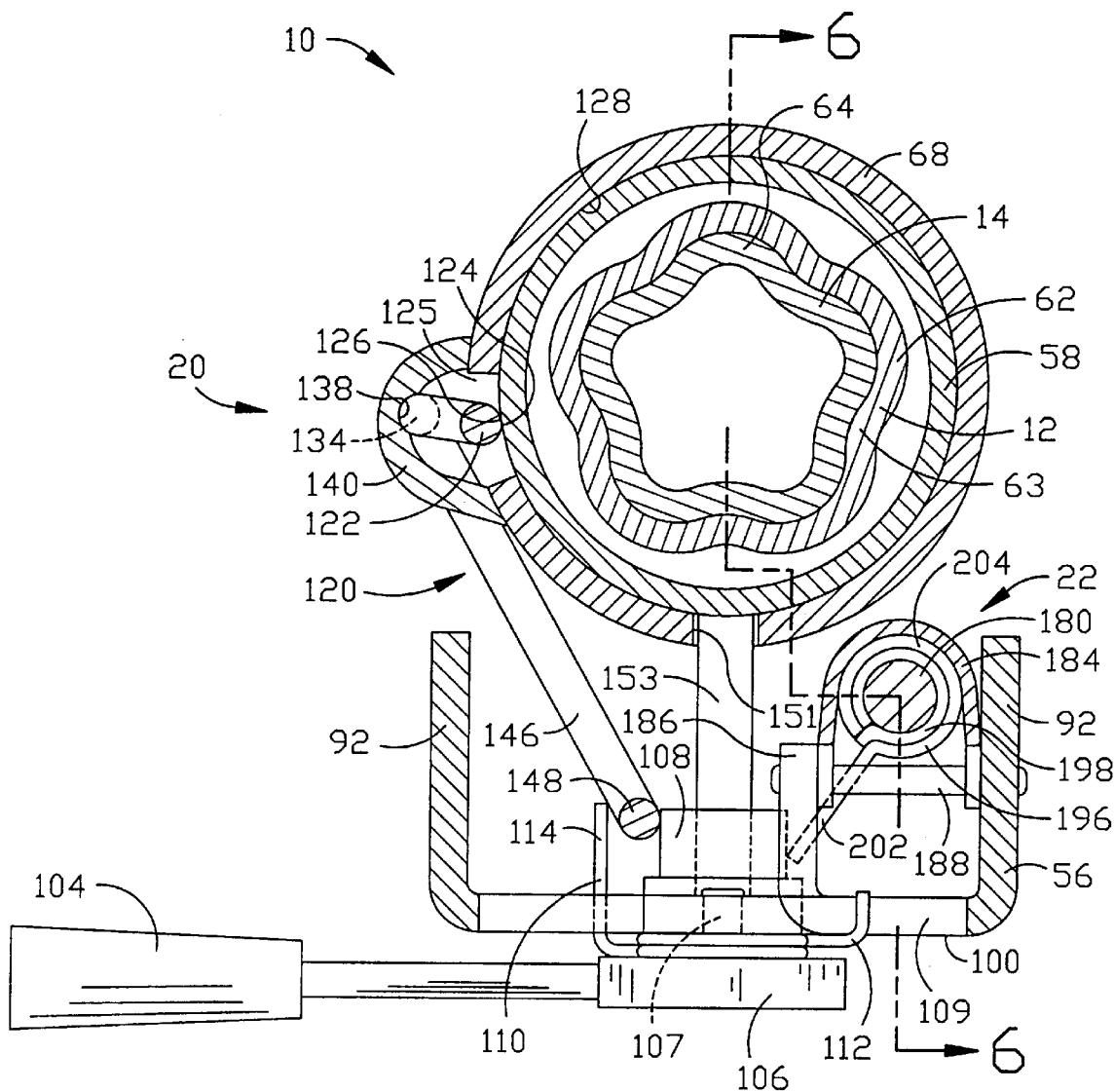
FIG. 3 is another sectional view of the steering column of FIG. 1, showing a telescope locking mechanism of the steering column in a locked position.
Figure 4:
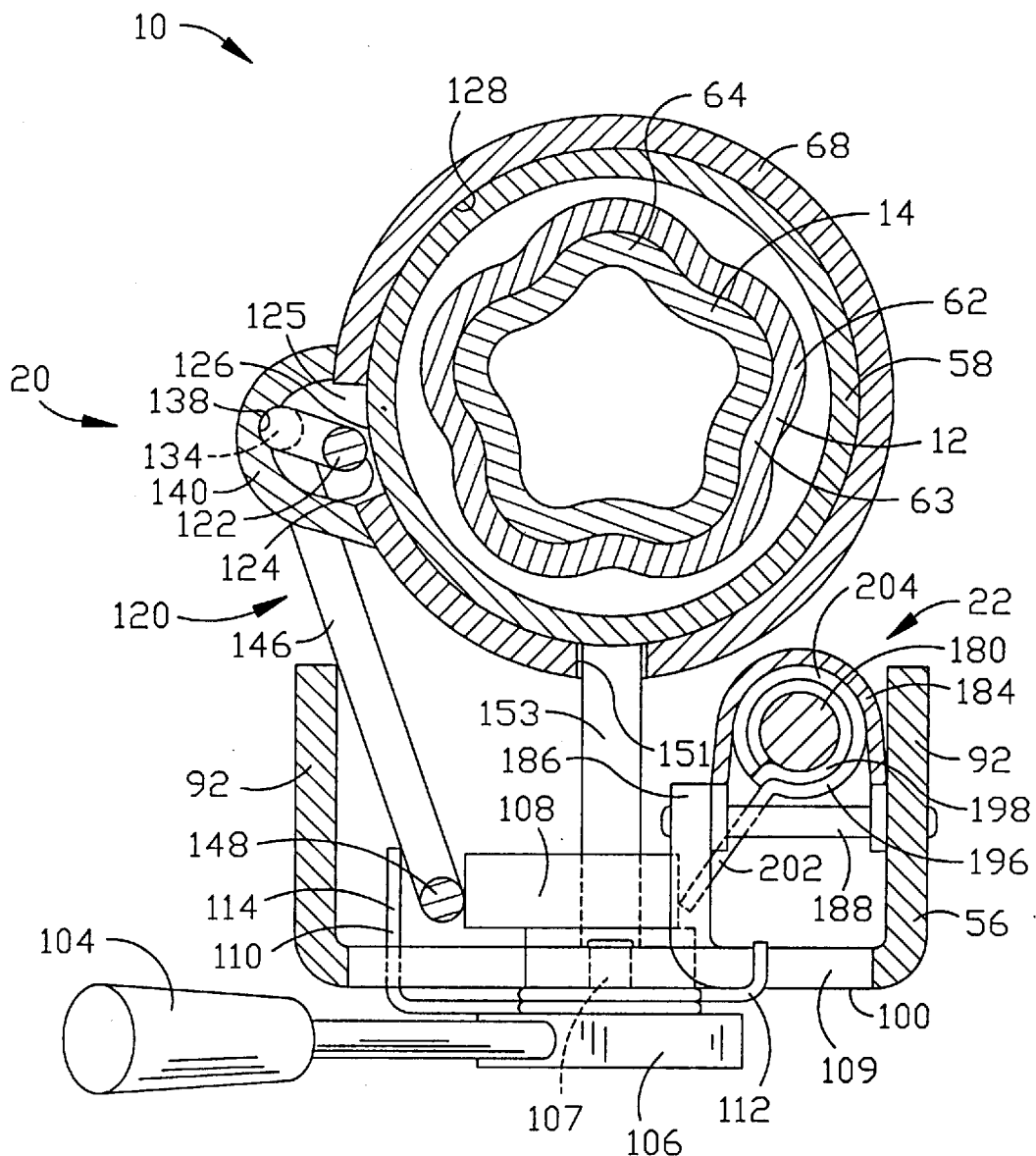
FIG. 4 is a sectional view, generally similar to FIG. 3, showing the telescope locking mechanism of the steering column in an unlocked position.

The telescope locking member 120 (FIG. 5) includes an upper support portion 132 and a lower support portion 134 located on axially opposite sides of the toothed portion 122. The portions 132 and 134 are offset from the toothed portion 122. The portions 132 and 134 are pivotally received in recesses 138 (one of which is shown in FIG. 3) located in a pivot support 140 connected to the tubular support 68. The pivot support 140 supports the telescope locking member 120 for pivotal movement about an axis of the portions 132 and 134 which extend parallel to the jacket tube 58 and steering column members 12, 14. The pivot support 140 is sized to permit pivoting of the telescope locking member 120 from an engaged position (FIG. 3) in which the teeth 124 engage teeth 126 on the jacket tube 58 to a position in which the teeth 124 on the telescope locking member 120 are spaced from the teeth on the jacket tube (FIG. 4).

Portions 144 and 146 (FIG. 5) of the telescope locking member 120 extend transverse to the portions 132, 134 and toward the actuator member 106. A portion 148 interconnects the transverse portions 144 and 146 of the telescope locking member 120. The actuator member 106 (FIG. 3) and the end 114 of the torsion spring 110 engage the portion 148 of the telescope locking member 120.

The tubular support 68 has a longitudinally extending slot 151 (FIG. 1). A bolt 152 extends through an opening in the portion 100 of the bracket 56, through the slot 151, and threadably engages an opening 150 in the jacket tube 58. A sleeve 153 (FIG. 3) circumscribes the bolt 152 and extends between the portion 100 of the bracket 56 and the jacket tube 58. The axial ends of the slot 151 engage the sleeve 153 to define the limits of axial movement of the steering column member 12 relative to the steering column member 14. Also, the bolt 152 and sleeve 153 provide support for the bracket 56.

Figure 6:
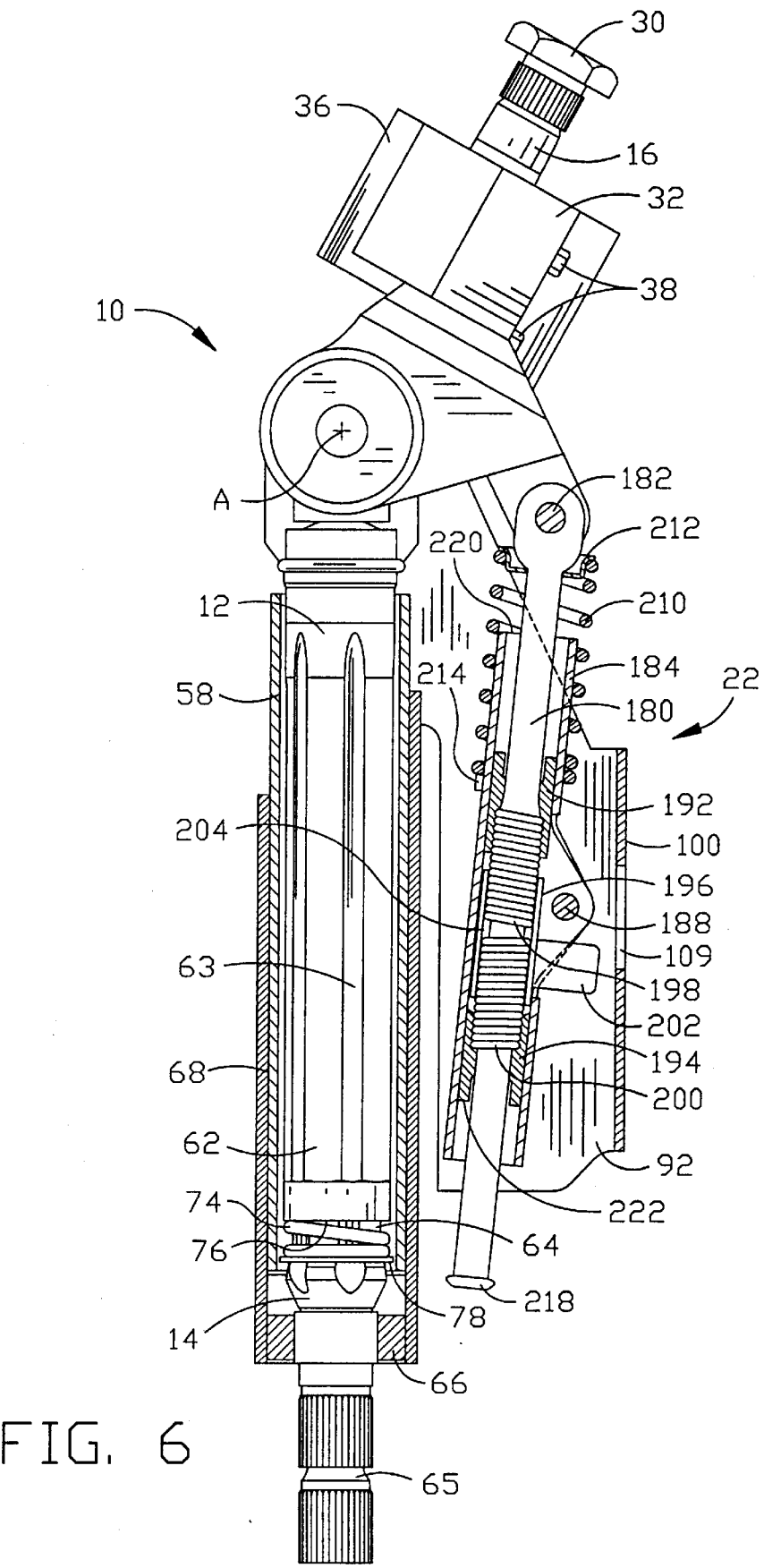
FIG. 6 is a sectional view taken along the line 6—6 of FIG. 3, showing a tilt locking mechanism of the steering column.

A tilt-lock bar 180 (FIGS. 1 and 6) is pivotally connected to the upper housing 32 by a pin 182. The tilt-lock bar 180 extends through a tubular member 184 (FIG. 6). The tubular member 184 is pivotally connected between one of the side walls 92 of the bracket 56 and a flange 186 (FIG. 3) of the bracket by a pin 188.

A pair of bushings 192 and 194 (FIG. 6) are located within the tubular member 184. The bushings 192 and 194 are connected to the tubular member 184 and support the tilt-lock bar 180 for axial movement relative to the tubular member. The bushings 192 and 194 are located on opposite sides of a lever 196. A coil spring 198 is connected at one end to the bushing 192 and at its other end to the lever 196. Another coil spring 200 is connected at one end to the bushing 194 and at its other end to the lever 196. The springs 198 and 200 are normally tightly wound on the periphery of the tilt-lock bar 180 so that, when fully wound, they grip the tilt-lock bar to prevent relative movement between the tilt-lock bar and the tubular member 184. Rotation of the lever 196 about the axis of the tilt-lock bar 180 causes the springs 198 and 200 to become partially unwound and release their grip on the tilt-lock bar 180.

The lever 196 has a control extension 202 engaging the portion 108 of the actuator member 106, see FIG. 3, and integral with a cylindrical body portion 204 (FIG. 6). The body portion 204 extends around portions of the springs 198 and 200. An inner end of each of the springs 198 and 200 is retained between an edge of the body portion 204 and the control extension 202 to fix the inner end of each of the springs to the lever 196. Outer ends of the springs 198 and 200 are fixed within the bushings 192 and 194, respectively, and thus, to the tubular member 184. Thus, when the lever 196 is rotated about the tilt-lock bar 180, the outer ends of the springs 198 and 200 can not be moved about the axis of the tilt-lock bar 180 and the force imparted to the springs by the lever 196 causes the springs to unwind.

A tilt spring 210 extends between a spring retainer flange 212 on the tilt-lock bar 180 and a flange 214 located on the tubular member 184. The tilt spring 210 biases the input shaft 16 to pivot in a counterclockwise direction, as viewed in FIG. 6, relative to the steering column member 12. The spring retainer flange 212 defines an extreme clockwise pivot position of the input shaft 16. When the spring retainer flange 212 of the tilt-lock bar 180 engages an upper surface 220 of the tubular member 184, the input shaft 16 is in the extreme clockwise pivot position. A lower flange 218 of the tilt-lock bar 180 can be received in the tubular member 184 and defines an extreme counterclockwise pivot position of the input shaft 16. When the flange 218 of the tilt-lock bar 180 engages a lower surface 222 of the bushing 194, the input shaft 16 is in the extreme counterclockwise pivot position.

The portion 108 (FIG. 3) of the actuator member 106 that extends into the opening 109 in the bracket 56 engages the portion 148 of the telescope locking member 120 and the lever 196. Upon pivoting the handle 104 and the actuator member 106 in one direction, the actuator member pivots the telescope locking member 120 to release the telescope locking mechanism 20. Upon pivoting the handle 104 and the actuator member 106 in another direction, the actuator member moves the lever 196 to unlock the tilt locking mechanism 22.

Upon pivoting of the handle 104 and the actuator member 106 so that the portion 108 moves toward the portion 148 of the telescope locking member 120, the telescope locking member pivots about the axis of the portions 132 and 134. Upon pivotal movement of the telescope locking member 120, the teeth 124 of the portion 122 disengage from the teeth 126 on the jacket tube 58, as seen in FIG. 4. The telescope locking member 120 also releases the jacket tube 58 from being pressed against the inner surface 128 of the support 68. The telescope locking member 120 releases the jacket tube 58 and the steering column member 12 can be moved axially, telescoped, relative to the steering column member 14.

Upon release of the handle 104, the spring 110 causes the telescope locking member 120 to pivot so that the teeth 124 engage the teeth 126 of the jacket tube 58, as seen in FIG. 3, and the telescope locking member presses the jacket tube against the inner surface 128 of the support 68. The spring 110 also causes the handle 104 and the actuator member 106 to move to their initial positions. Accordingly, the steering column member 12 is locked in its axial position relative to the steering column member 14.

Upon pivoting of the handle 104 and the actuator member 106 so that the portion 108 of the actuator member moves towards the lever 196, the springs 198 and 200 are unwound to allow the tilt-lock bar 180 to move relative to the tubular member 184. Therefore, the input shaft 16 can pivot relative to the steering column member 12. Upon release of the handle 104 and the actuator member 106, after the input shaft 16 has been pivotally positioned relative to the steering column member 12, the springs 198 and 200 cause the lever 196 to move the handle 104 and the actuator member 106 to their initial positions.

When the tilt locking mechanism 22 is released, the tilt-lock bar 180 is movable relative to the tubular member 184 and the bracket 56 to position the input shaft 16 in any one of an infinite number of pivot positions. While adjusting the pivot position of the input shaft 16, the tilt-lock bar 180 pivots relative to the upper housing 32 and the tilt-lock bar and the tubular member 184 pivot together relative to the bracket 56.

Figure 7:
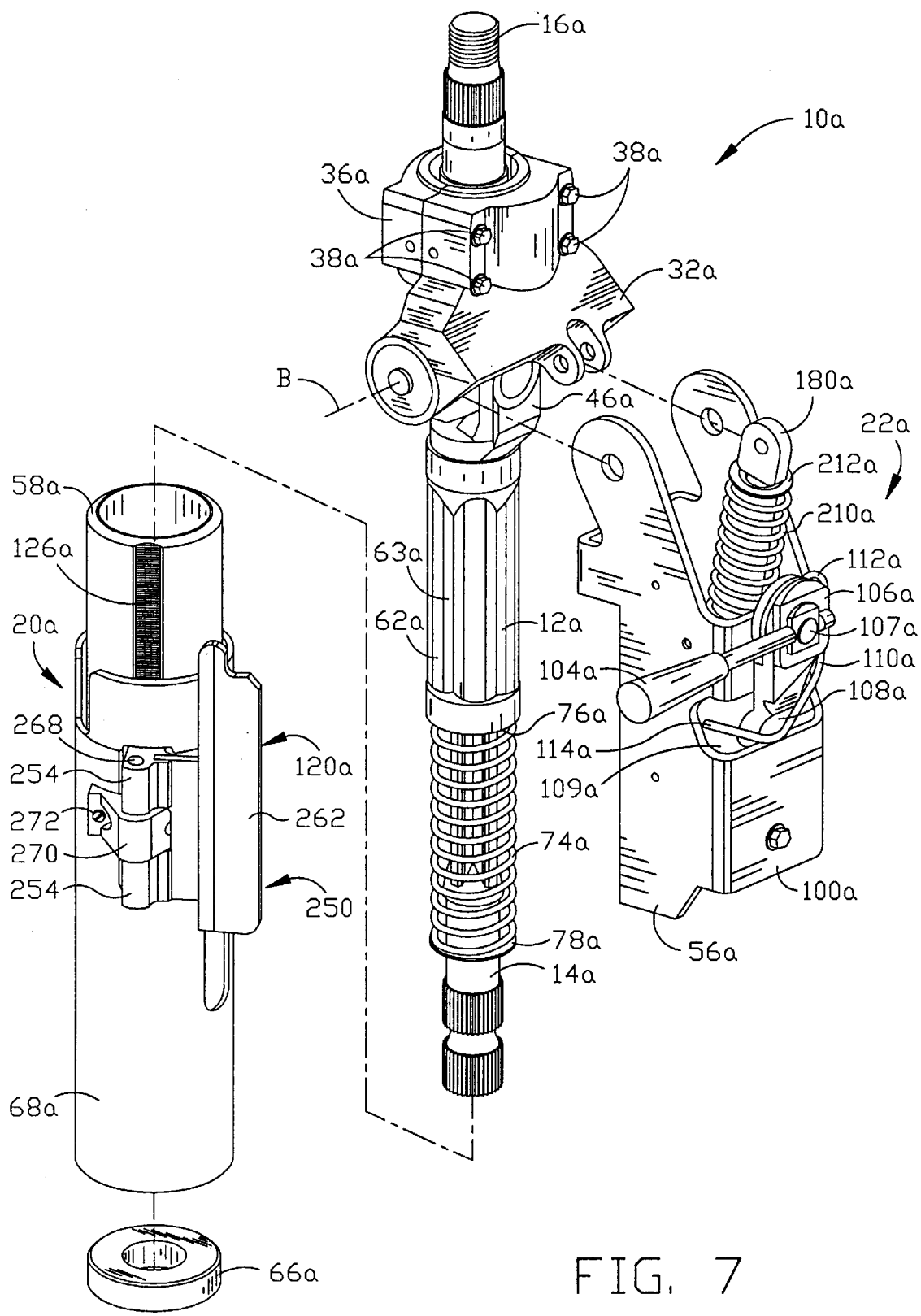
FIG. 7 is an exploded view of a second embodiment of a steering column of the present invention.
Figure 8:
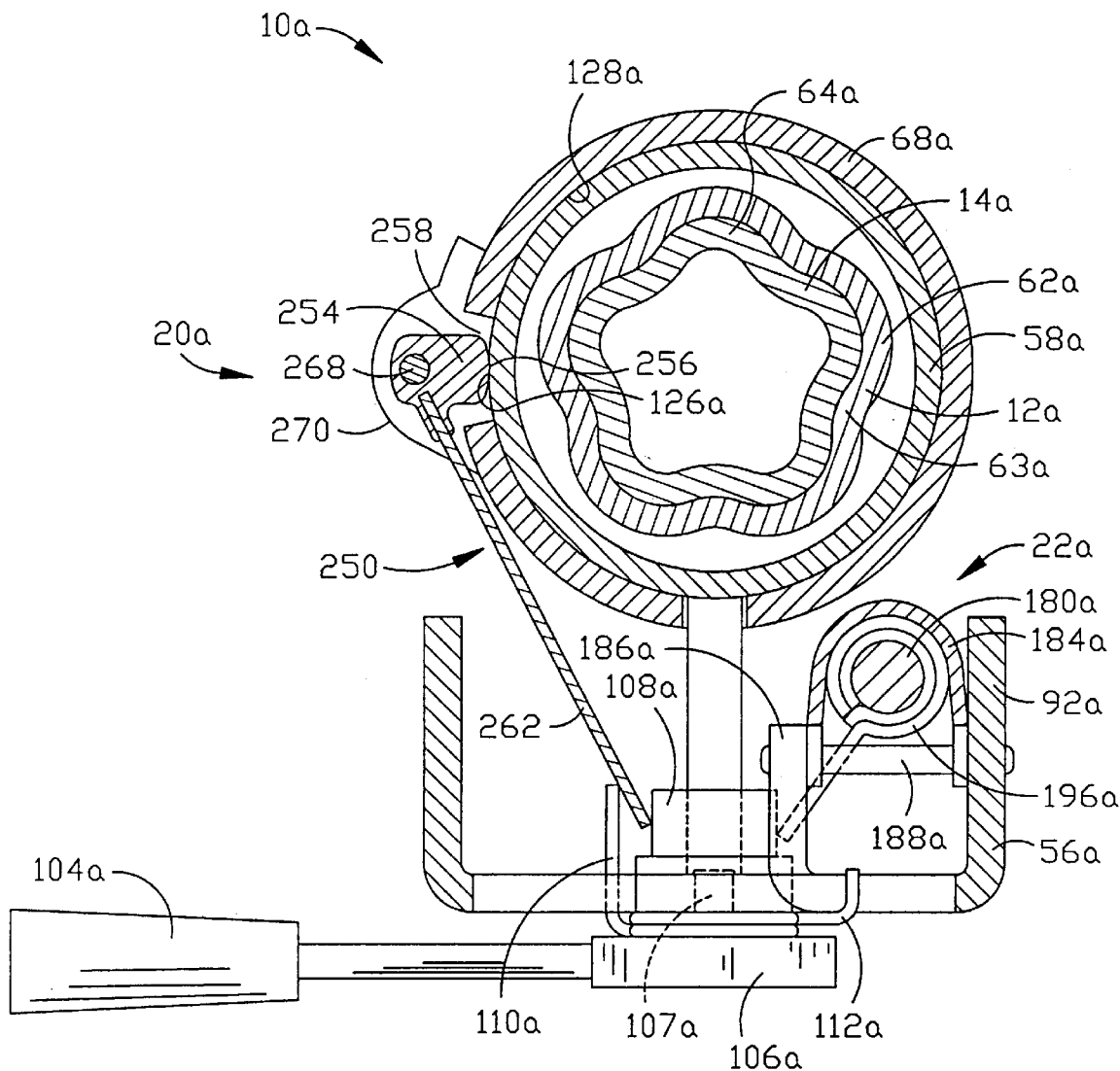
FIG. 8 is a sectional view of the steering column of FIG. 7, showing a telescope locking mechanism of the steering column in a locked position.
Figure 9:
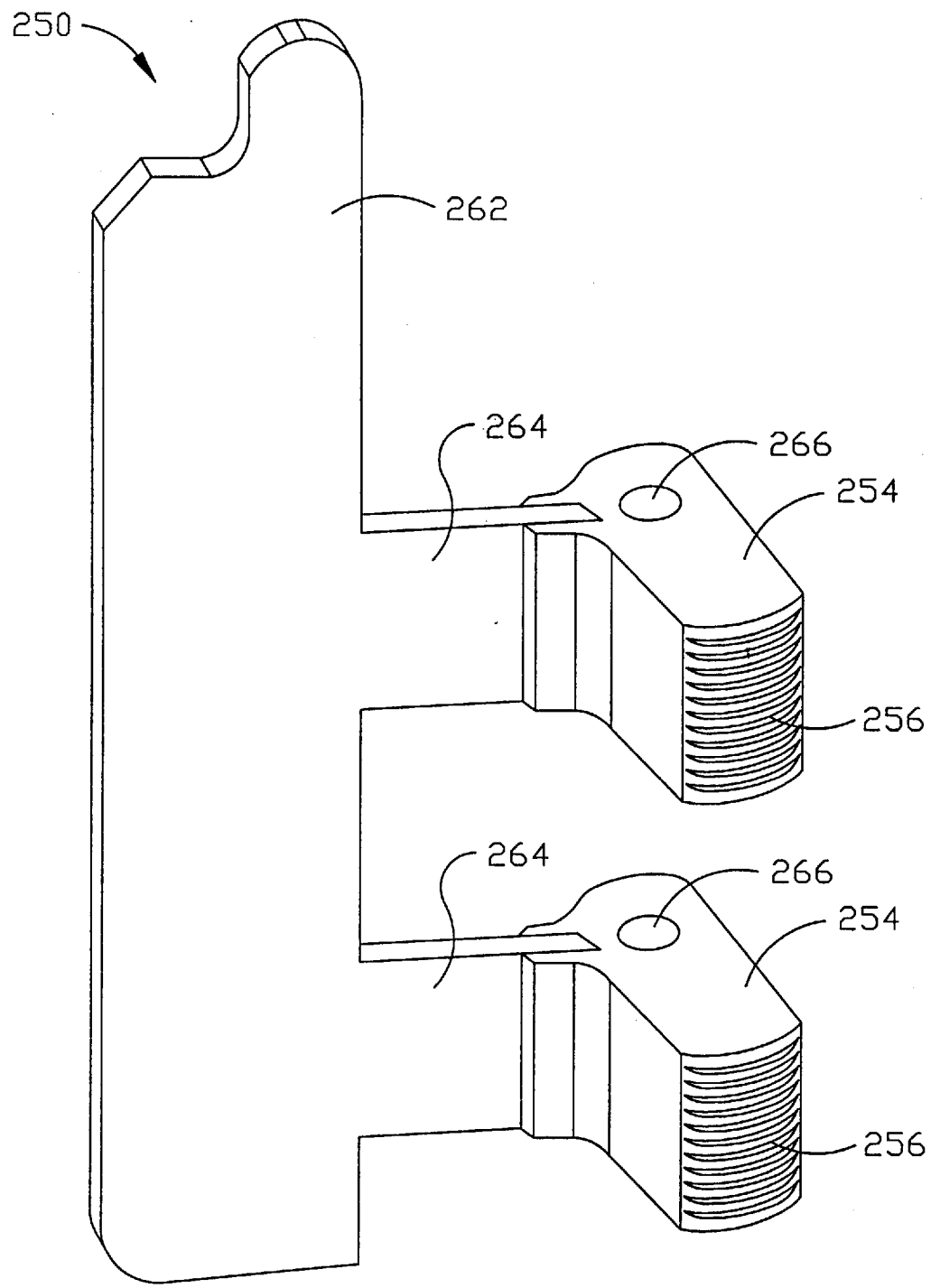
FIG. 9 is an enlarged pictorial view of a telescope locking member of the steering column of FIG. 7.

In the embodiment of the invention illustrated in FIGS. 1–6, the telescope locking member 120 is formed from a rod and has a toothed portion 122 for engaging the teeth 126 of the jacket tube 58. In the embodiment of the invention illustrated in FIGS. 7–9, the telescope locking member is a paddle with two cams having teeth. Since the embodiment of the invention illustrated in FIGS. 7–9 is generally similar to the embodiment of the invention illustrated in FIGS. 1–6, similar numerals will be utilized to designate similar components, the suffix letter "a" being associated with the numerals of FIGS. 7–9 to avoid confusion.

An axially and angularly adjustable vehicle steering column 10a (FIG. 7) includes a pair of steering column members 12a, 14a and an input shaft 16a. A vehicle steering wheel (not shown) is attached to the input shaft 16a. The steering column members 12a, 14a telescope to effect axial adjustment of the steering wheel. The input shaft 16a is pivotable relative to the steering column member 12a to effect angular adjustment of the steering wheel.

A releasable telescope locking mechanism 20a (FIG. 7) locks the steering column members 12a, 14a in any one of a plurality of telescope positions. A releasable tilt-locking mechanism 22a locks the input shaft 16a in any one of an infinite number of pivot positions relative to the steering column member 12a. The input shaft 16a extends into an upper housing 32a. Bearings (not shown) are located in the upper housing 32a and support the input shaft 16a for rotation relative to the upper housing 32a. A cover 36a is connected to the upper housing 32a by screws 38a.

A universal joint 46a is connected between the input shaft 16a and the steering column member 12a. The input shaft 16a can pivot, relative to the steering column member 12a, about a pivot axis B of the universal joint 46a. The upper housing 32a is pivotally connected to a bracket 56a which is connected to a jacket tube 58a. The upper housing 32a is pivotable about the axis B relative to the bracket 56a and the jacket tube 58a. Therefore, the upper housing 32a pivots along with the input shaft 16a relative to the bracket 56a and the steering column member 12a.

The steering column member 14a extends into a lower tubular shaft portion 62a of the steering column member 12a. The tubular shaft portion 62a has internal splines 63a (FIG. 8) thereon which mesh with external splines 64a on the steering column member 14a. The splines 63a of the steering column member 12a mesh with the splines 64a of the steering column member 14a to effect rotation of the steering column member 14a upon rotation of the steering column member 12a.

The steering column member 14a is supported by a bearing 66a (FIG. 7) for rotation relative to a tubular support 68a which is connectable to a frame of the vehicle in any known manner. Upon rotation of the steering wheel, the input shaft 16a and the steering column members 12a, 14a rotate and the rotational movement is transmitted to an output shaft (not shown) to effect vehicle steering.

The steering column members 12a, 14a may be moved axially (telescoped) relative to each other. A spring 74a circumscribes the steering column member 14a and acts between an axial end surface 76a of the steering column member 12a and a flange 78a connected to the steering column member 14a. The spring 74a acts to bias the steering column member 12a in a vertical direction, as viewed in FIG. 7, relative to the steering column member 14a.

A handle 104a and actuator member 106a, connected to the handle, are pivotally mounted on a portion 100a of the bracket 56a by a pin 107a. A portion 108a of the actuator member 106a extends into an opening 109a in the portion 100a of the bracket 56a. A torsion spring 110a extends around the actuator member 106a to bias the handle 104a and the actuator member to an initial position in which the telescope locking mechanism 20a and the tilt locking mechanism 22a are locked. The handle 104a, actuator member 106a, and spring 110a move along with the bracket 56a, the jacket tube 58a, and the steering column member 12a relative to the steering column member 14a.

An end 112a of the spring 110a engages the portion 100a of the bracket 56a and the other end 114a of the spring engages a paddle-shaped telescope locking member 250. The portion 108a of the actuator member 106a also engages the telescope locking member 250. The telescope locking member 250 (FIG. 9) includes a pair of axially spaced cams 254 with a plurality of relatively small teeth 256. The cams 254 extend through openings 258 (one of which is shown in FIG. 8) for engaging a plurality of relatively small teeth 126a (FIG. 7) on the jacket tube 58a. When the cams 250 engage the teeth 126a on the jacket tube 58a, they also press the jacket tube against an inner surface 128a of the support 68a.

The telescope locking member 250 (FIGS. 8 and 9) includes a paddle portion 262 and a pair of arms 264 extending between the paddle portion 262 and the cams 254. The cams 254 are connected to the arms 264 in any known manner. Each of the cams 254 includes an opening 266 for receiving a pivot rod 268 (FIGS. 7 and 8). A pivot support 270 is connected to the support 68a and has an opening for receiving the pivot rod 268. The pivot support 270 is connected to the support 68a by a screw 272. The support 270 is located between the cams 254.

The tilt locking mechanism 22a is substantially similar to the tilt locking mechanism 22 of the embodiment illustrated in FIGS. 1–6, therefore, the tilt locking mechanism 22a will not be described in detail. A tilt-lock bar 180a (FIG. 7) is pivotally connected to the upper housing 32a. The tilt-lock bar 180a extends through a tubular member 184a (FIG. 8) pivotally connected between a sidewall 92a of the bracket 56a and a flange 186a of the bracket by a pin 188a. A pair of bushings are located within the tubular member 184a. The bushings are connected to the tubular member 184a and support the tilt-lock bar 180a for axial movement relative to the tubular member. Coil springs are connected to the bushings at one of their ends and to a lever 196a at their other ends. The springs are normally tightly wound on the periphery of the tilt-lock bar 180a so that, when fully wound, they grip the tilt-lock bar to prevent relative movement between the tilt-lock bar and the tubular member 184a. Rotation of the lever 196a about the axis of the tilt-lock bar 180a causes the springs to become partially unwound and release their grip on the tilt-lock bar 180a.

A tilt spring 210a (FIG. 7) extends between a spring retainer flange 212a on the tilt-lock bar 180a and a flange located on the tubular member 184a. The tilt spring 210a biases the input shaft 16a to pivot in a first direction relative to the steering column member 12a. The spring retainer flange 212a defines one extreme pivot position of the input shaft 16a. A lower flange of the tilt-lock bar 180a defines the other extreme pivot position of the input shaft 16a.

The portion 108a (FIG. 8) of the actuator member 106a that extends into the opening 109a in the bracket 56a engages the paddle portion 262 of the telescope locking member 250 and the lever 196a. Upon pivoting the handle 104a and the actuator member 106a in one direction, the actuator member pivots the telescope locking member 250 to release the telescope locking mechanism 20a. Upon pivoting the handle 104a and the actuator member 106a in another direction, the actuator member moves the lever 196a to unlock the tilt locking mechanism 22a.

Upon pivoting of the handle 104a and the actuator member 106a so that the portion 108a moves toward the paddle 262 of the telescope locking member 250, the telescope locking member pivots about the axis of the pivot rod 268. Upon pivotal movement of the telescope locking member 250, the teeth 256 of the cams 254 are spaced from the teeth 126a on the jacket tube 58a. The telescope locking member 250 also releases the jacket tube 58a from being pressed against the inner surface 128a of the support 68a. The jacket tube 58a and the steering column member 12a can be moved axially, telescoped, relative to the steering column member 14a.

Upon release of the handle 104a, the spring 110a causes the telescope locking member 250 to pivot so that the teeth 256 engage the teeth 126a of the jacket tube 58a and the telescope locking member presses the jacket tube against the inner surface 128a of the support 68a. The spring 110a also causes the handle 104a and the actuator member 106a to move to their initial positions. Accordingly, the steering column member 12a is locked in its axial position relative to the steering column member 14a.

Upon pivoting of the handle 104a and the actuator member 106a so that the portion 108a of the actuator member moves toward the lever 196a, the springs gripping the tilt-lock bar 180a are unwound to allow the tilt-lock bar to move relative to the tubular member 184a. Therefore, the input shaft 16a can pivot relative to the steering column member 12a. Upon release of the handle 104a and the actuator member 106a, after the input shaft 16a has been pivotally positioned relative to the steering column member 12a, the springs cause the lever 196a to move the handle 104a and the actuator member 106a to their initial positions.

Although the steering columns have been shown as permitting a tilt adjustment, it is contemplated that the telescope locking mechanism could be used without a tilt adjustment.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:

first and second steering column members, said first steering column member being axially movable relative to said second steering column member;

a member connected to said first steering column member and movable with said first steering column member relative to said second steering column member, said member including a plurality of teeth;

support means for connecting said steering column to a vehicle frame; and a telescope locking member engageable with said plurality of teeth on said member connected to said first steering column member, said telescope locking member having a first position in which said telescope locking member engages at least one of said plurality of teeth on said member connected to said first steering column member to prevent movement of said first steering column member relative to said second steering column member and a second position in which said telescope locking member is spaced from said plurality of teeth on said member connected to said first steering column member to permit axial movement of said first steering column member relative to said second steering column member, said telescope locking member pressing said member connected to said first steering column member against said support means to prevent said member and said first steering column member from moving relative to said support means when said telescope locking member is in its first position.

2. A steering column as set forth in claim 1 wherein said telescope locking member includes a portion extending parallel to said member connected to said first steering column member, said portion of said telescope locking member having a plurality of teeth engageable with said plurality of teeth on said member connected to said first steering column member.

3. A steering column as set forth in claim 1 wherein said support means supports said telescope locking member for pivotal movement about an axis extending parallel to a longitudinal axis of said second steering column member.

4. A steering column as set forth in claim 1 wherein said member connected to said first steering column member comprises a jacket tube circumscribing said first steering column member, said support means including a tubular member circumscribing at least a portion of said jacket tube, said telescope locking member pressing said jacket tube against an inner wall of said tubular member when said telescope locking member is in its first position.

5. A steering column as set forth in claim 1 wherein said support means includes a tubular member having an opening through which a portion of said telescope locking member extends to engage said plurality of teeth on said member connected to said first steering column member.

6. A steering column as set forth in claim 1 wherein said telescope locking member comprises a contoured rod having a portion extending generally parallel to a longitudinal axis of said second steering column member, said portion extending generally parallel to said axis of said second steering column member including a plurality of teeth engageable with said plurality of teeth on said member connected to said first steering column member.

7. A steering column as set forth in claim 6 wherein said support means supports said rod for pivotal movement about an axis offset from an axis of said portion of said rod with said plurality of teeth.

8. A steering column as set forth in claim 7 wherein said support means includes means extending around said portion of said rod with said plurality of teeth for supporting said telescope locking member for pivotal movement.

9. A steering column as set forth in claim 1 wherein said telescope locking member comprises first and second cams axially spaced from each other, each of said first and second cams including a plurality of teeth for engaging said plurality of teeth on said member connected to said first steering column member.

10. A steering column as set forth in claim 9 wherein said support means includes openings through which said first and second cams extend to engage said teeth on said member connected with said first steering column member.

11. A steering column as set forth in claim 1 further including means for biasing said telescope locking member to its first position.

12. A steering column as set forth in claim 11 further including an actuator member for moving said telescope locking member from its first position to its second position, said actuator member having a first position in which said telescope locking member is in its first position and a second position in which said locking member is in its second position, said actuator member being movable with said first steering column member relative to said second steering column member and said locking member, said biasing means biasing said actuator member to its first position.

13. A steering column as set forth in claim 12 wherein said biasing means comprises a torsion spring wrapped around a portion of said actuator member.

14. A steering column as set forth in claim 1 further including an input shaft connectable with a steering wheel and supported on said first steering column member for pivotal movement relative to said first steering column member about an axis extending transverse to the direction of movement between said first and second steering column members and tilt locking means for locking said input shaft in any one of a plurality of pivot positions relative to said first steering column member.

15. A steering column as set forth in claim 14 wherein said tilt locking means includes means for locking said input shaft in any one of an infinite number of pivot positions relative to said first steering column member.

16. A steering column as set forth in claim 14 further including an actuator member for moving said telescope locking member from its first position to its second position and for unlocking said tilt locking means, said actuator member having a first position in which said telescope locking member is in its first position and said tilt locking means is locked, a second position in which said telescope locking member is in its second position and said tilt locking means is locked, and a third position in which said tilt locking means is unlocked and said telescope locking member is in its first position.

17. A steering column as set forth in claim 16 further including means biasing said actuator member into its first position.

18. A steering column comprising:
first and second steering column members, said first steering column member being axially movable relative to said second steering column member;
a member connected to said first steering column member and movable with said first steering column member relative to said second steering column member, said member including a plurality of teeth;
support means for connecting said steering column to a vehicle frame; and
a telescope locking member including a plurality of teeth for engaging said plurality of teeth on said member connected to said first steering column member, said telescope locking member having a first position in which said plurality of teeth on said telescope locking member engage said plurality of teeth on said member connected to said first steering column member to prevent movement of said first steering column member relative to said second steering column member and a second position in which said plurality of teeth on said telescope locking member are spaced from said plurality of teeth on said member connected to said first steering column member to permit axial movement of said first steering column member relative to said second steering column member.

19. A steering column as set forth in claim 18 wherein said telescope locking member includes a portion having said plurality of teeth extending parallel to said member connected to said first steering column member.

20. A steering column as set forth in claim 18 wherein said support means supports said telescope locking member for pivotal movement about an axis extending parallel to a longitudinal axis of said second steering column member.

21. A steering column as set forth in claim 18 wherein said member connected to said first steering column member comprises a jacket tube circumscribing said first steering column member, said support means including a tubular member circumscribing at least a portion of said jacket tube, said telescope locking member pressing said jacket tube against an inner wall of said tubular member when said telescope locking member is in its first position.

22. A steering column as set forth in claim 18 wherein said telescope locking member comprises a contoured rod having a portion with said plurality of teeth extending generally parallel to a longitudinal axis of said second steering column member, said support means supporting said rod means for pivotal movement about an axis offset from an axis of said portion of said rod means with said plurality of teeth.

23. A steering column as set forth in claim 18 wherein said telescope locking member comprises first and second cams axially spaced from each other, each of said first and second cams including a plurality of teeth for engaging said plurality of teeth on said member connected to said first steering column member.

24. A steering column as set forth in claim 18 further including means for biasing said telescope locking member to its first position.

25. A steering column as set forth in claim 24 further including an actuator member for moving said telescope locking member from its first position to its second position, said actuator member having a first position in which said telescope locking member is in its first position and a second position in which said telescope locking member is in its second position, said actuator member being movable with said first steering column member relative to said second steering column member and said locking member, said biasing means biasing said actuator member to its first position.

26. A steering column as set forth in claim 25 wherein said biasing means comprises a torsion spring wrapped around a portion of said actuator member.

27. A steering column as set forth in claim 18 further including an input shaft connectable with a steering wheel and supported on said first steering column member for pivotal movement relative to said first steering column member about an axis extending transverse to the direction of movement between said first and second steering column members and tilt locking means for locking said input shaft in any one of a plurality of pivot positions relative to said first steering column member.

28. A steering column as set forth in claim 27 wherein said tilt locking means includes means for locking said input shaft in any one of an infinite number of pivot positions relative to said first steering column member.

29. A steering column as set forth in claim 27 further including an actuator member for moving said telescope locking member from its first position to its second position and for unlocking said tilt locking means, said actuator member having a first position in which said telescope locking member is in its first position and said tilt locking means is locked, a second position in which said telescope locking member is in its second position and said tilt locking means is locked, and a third position in which said tilt locking means is unlocked and said telescope locking member is in its first position.

30. A steering column as set forth in claim 29 further including means biasing said actuator member into its first position.

* * * * *